July 29, 1958
D. B. DOOLITTLE ET AL
2,845,237
PUSHER-TYPE CATAPULT SYSTEM
Filed June 15, 1956
5 Sheets-Sheet 2
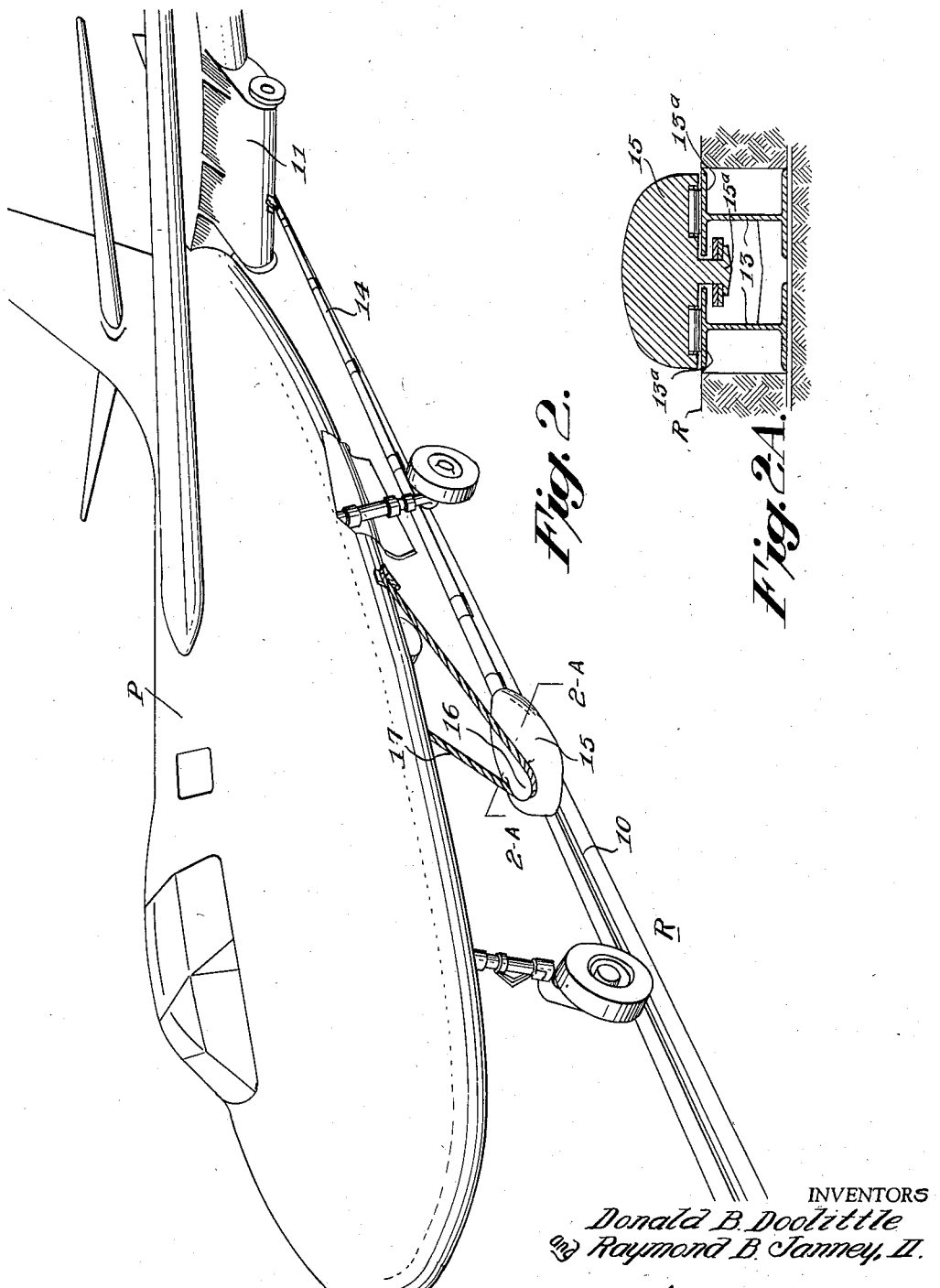
INVENTORS
Donald B. Doolittle
and Raymond B. Janney, II.
BY Herbert M. Birch
ATTORNEY

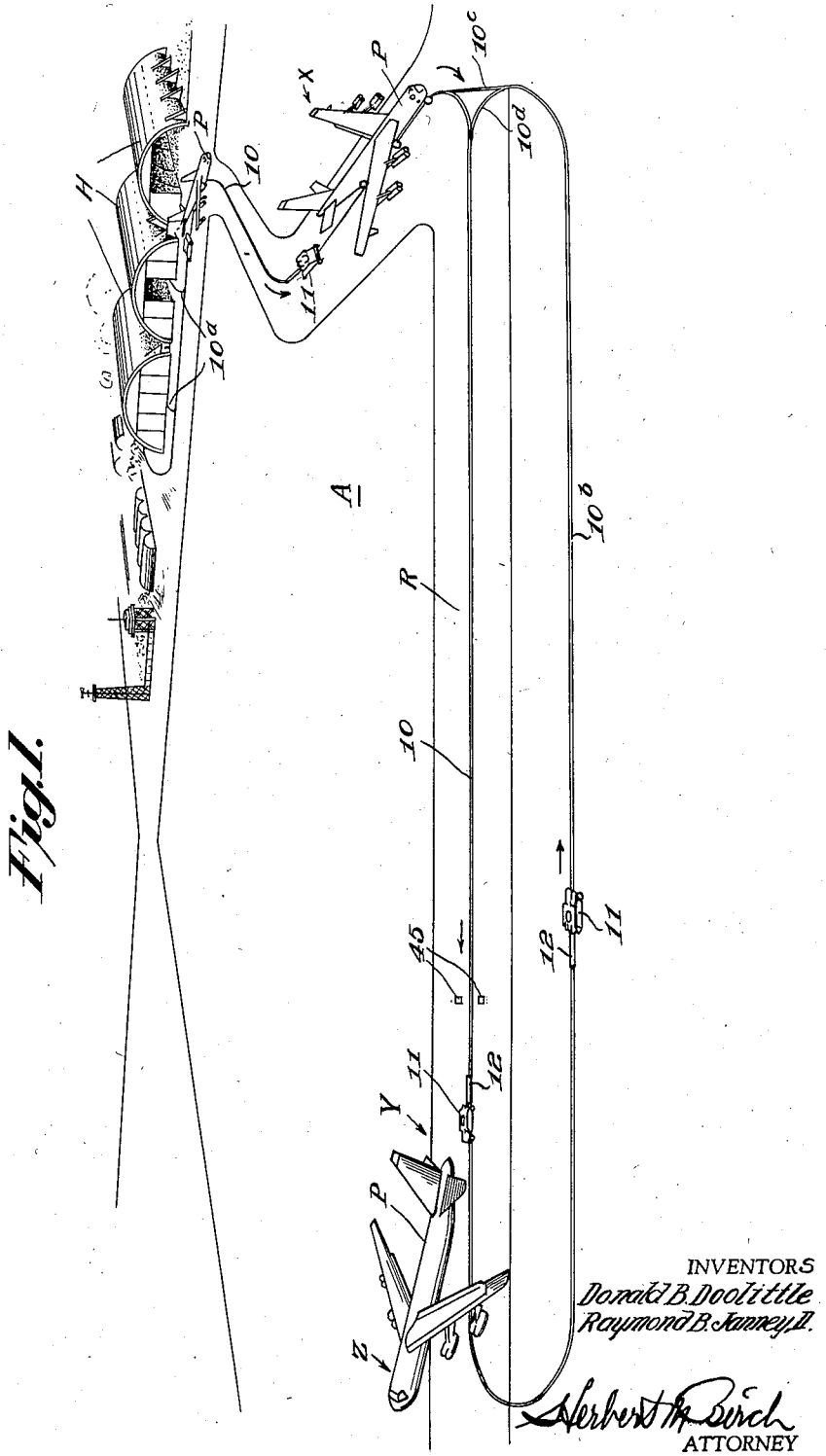

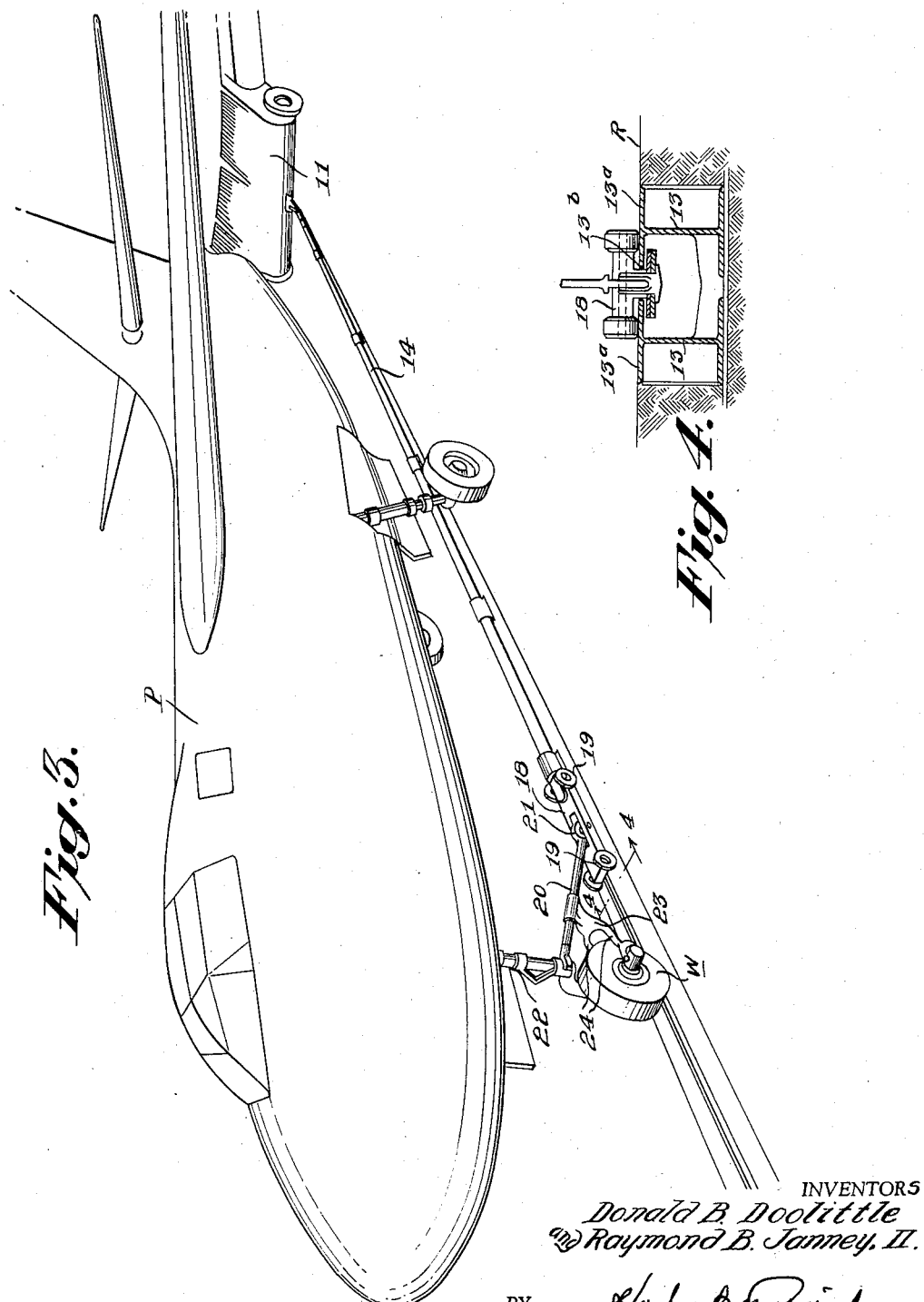

July 29, 1958  D. B. DOOLITTLE ET AL  2,845,237
PUSHER-TYPE CATAPULT SYSTEM
Filed June 15, 1956  5 Sheets-Sheet 4
*Fig. 5-A.*
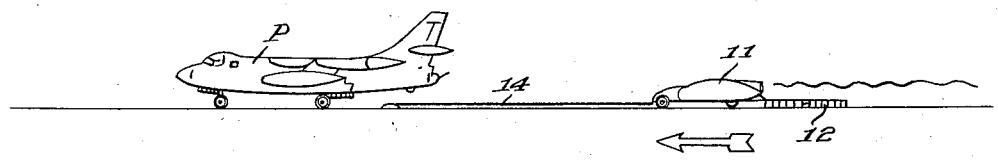
*Fig. 5-B.*
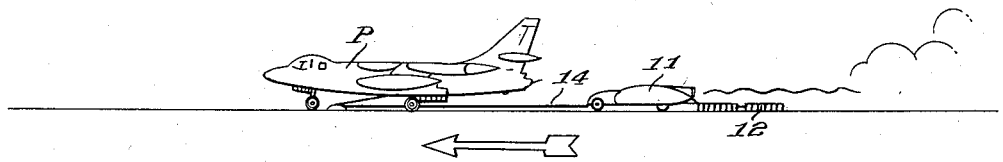
*Fig. 5-C.*
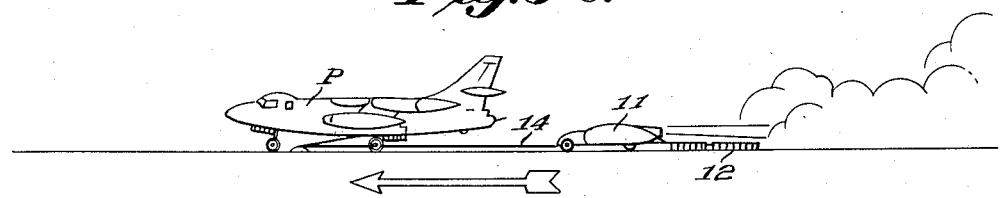
*Fig. 5-D.*
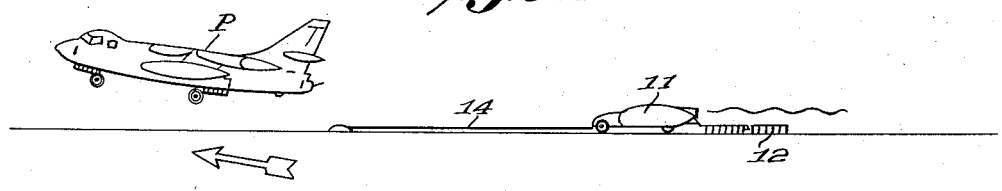
INVENTORS
Donald B. Doolittle
Raymond B. Janney, II.
BY
ATTORNEY

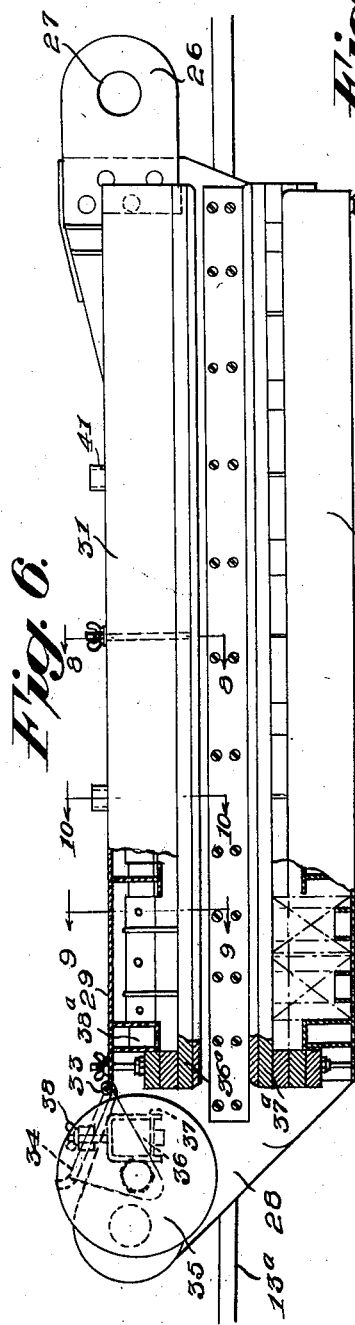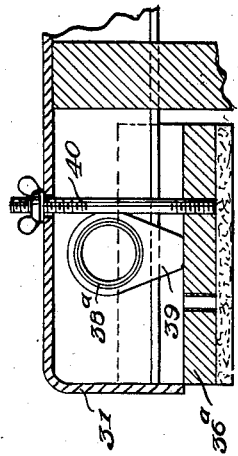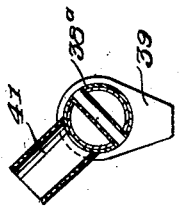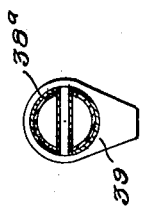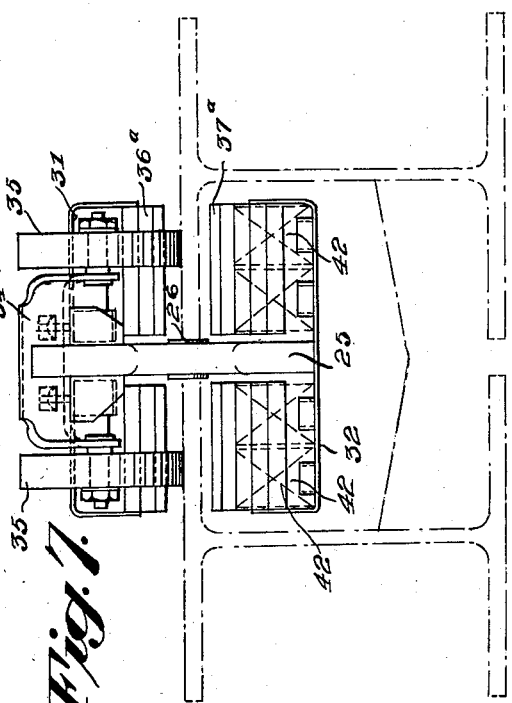

United States Patent Office 2,845,237
Patented July 29, 1958

2,845,237

PUSHER-TYPE CATAPULT SYSTEM

Donald B. Doolittle and Raymond B. Janney II, Wilmington, Del., assignors to All American Engineering Co., Wilmington, Del., a corporation of Delaware Application June 15, 1956, Serial No. 591,605

15 Claims. (Cl. 244—63)

This invention relates to a pusher-type catapult system.

The invention is more particularly concerned with a pusher catapult for effecting rapid acceleration of aircraft preparatory to take-off thereof, whereby the present extent of run necessary for take-off is materially reduced with a resulting requirement for relatively small airports.

A primary object of the invention is the provision of an aircraft accelerating pusher-type catapult comprising a light weight, high power and high speed pusher dolly with a guide track therefor, a track engageable brake assembly towed by the pusher dolly and means for cutting off the power to the pusher dolly at a point in predetermined spaced relation to the initial point of aircraft acceleration.

A further object of the invention is the provision of an aircraft accelerating system including aircraft hangars, an aircraft runway extending from the hangars, a guide track disposed beneath the surface of the said runway for guiding the pusher dolly and which track includes a loop for return of the pusher dolly after take-off of an aircraft accelerated thereby.

A still further object of the invention is the provision of novel track guided means projecting forwardly of the pusher dolly for detachable engagement with the aircraft in the acceleration thereof.

A still further object of the invention is a novel brake assembly adapted to be towed by the pusher dolly and which includes upper normally stationary adjustable brake shoes and lower spring pressed brake shoes, which ride along the upper and lower faces of guide rails having a relatively long inclined section and a relatively thick brake shoe engaging section for bringing the pusher dolly to rest, and wherein the upper normally stationary brake shoes are releasable for tension release in the lower brake shoe springs and a consequent release of the braking action, on the rails.

Other objects and advantages of the invention will become apparent in the course of the following detailed description, taken in connection with the accompanying drawings, wherein—

Figure 1 is a general perspective view of the pusher catapult system.

Figure 2 is a broken perspective view showing an aircraft being accelerated on the runway by the improved pusher-type catapult in accordance with one structural embodiment thereof.

Figure 2-A is a transverse sectional view of the pusher catapult guiding track as observed substantially in the plane of line 2–A—2–A on Figure 2 and showing the bridle engaging shuttle in section.

Figure 3 is a broken perspective view similar to Figure 2 but wherein is disclosed a modified embodiment of the invention.

Figure 4 is a transverse sectional view as observed substantially in the plane of line 4—4 on Figure 3.

Figures 5–A to 5–D inclusive are side elevational views showing the operation sequence in the catapulting system.

Figure 6 is a view of the dolly towed brake assembly, partly in side elevation and partly in longitudinal vertical section.

Figure 7 is a front elevational view of the brake assembly and wherein the guide track is shown in dot-and-dash lines.

Figure 8 is a transverse vertical sectional view as observed in the plane of line 8—8 on Figure 6.

Figure 9 is a transverse vertical sectional view as observed in the plane of line 9—9 on Figure 6.

Figure 10 is a transverse vertical sectional view as observed in the plane of line 10—10 on Figure 6.

Referring now in detail to the drawings, and first to Figure 1 thereof, A designates an airport which is similar in lay-out design to existing airports, but is substantially smaller due to substantially reduced lengths of runways occasioned by the improved pusher catapult system provided by the present invention.

As further indicated in Figure 1, the airport includes aircraft hangars H and one or more runways R.

The improved system generally comprises a track 10 leading from the hangars H, as by branch lines 10$^a$, and the track includes a terminal loop 10$^b$ for a purpose later to appear. The system further comprises a pusher dolly 11 and a track engageable brake assembly 12. The pusher dolly 11 is guided by the track 10, which is disclosed in a co-pending application of Robert B. Cotton et al., Serial No. 553,912, also assigned to the present assignee. The pusher dolly generally comprises a plurality of jet engines, four for example, which are capable of transmitting approximately 20,000,000 foot-pounds of energy into an airplane per thousand feet of accelerated run thereof, while the weight of the dolly is only 12,000 pounds.

The track 10 as indicated in Figures 2–A and 4 comprises a pair of laterally spaced parallel rails 13 of I-form and the upper guide flanges 13$^a$ thereof are flush with the runway R, and the adjacent edges of the guide flanges are in laterally spaced relation in the provision of a guide slot 13$^b$, in which a depending member of the pusher dolly is guided as set forth in said co-pending application. In accordance with the present invention, however, the guide flanges 13$^a$ include a thickened section adjacent a power release station later referred to, which section is preceded by a relatively long gradual tapered section for a purpose later to appear.

The pusher dolly 11 is provided with a pusher bar 14 and in accordance with the embodiment of Figure 2, the forward end of the pusher bar is provided with a shuttle 15 which, as indicated in Figure 2–A has a guiding engagement 15$^a$ with the track 10. The shuttle further comprises a forwardly projecting hook member 16 beneath which is removably received a bight of a bridle 17 suspended from the airplane P and in which embodiment, the bridle automatically disengages the hook upon arrest of movement of the pusher dolly and the take-off of the plane, the bridle, subsequently dropping from the plane.

In accordance with the embodiment of Figure 3, the forward end of the pusher bar 14 is provided with a carriage including a body portion 18, which is provided with runway engaging wheels 19 and a rod 20 has one end thereof pivotally connected to the body portion 18, as at 21. The opposite end of the rod 20 engages the retractible support 22 for the nose wheel and a bifurcated member 23 is supported by the rod 20 intermediate the ends thereof and the furcations 24 of the member 23 removably engage the axle of the nose wheel W. Since the rod 20 and member 23 have only a pushing engagement with the nose wheel assembly, the pusher bar 14 will, as in Figure 2, automatically disengage the plane upon arresting movement of the pusher dolly and take-off of the plane.

The brake assembly, shown in detail in Figures 6 to 10 inclusive, comprises an elongated vertically disposed main frame member 25 which as indicated in Figure 7 is of plate-like form and which in operative position of the brake assembly on the track 10 extends through the slot 13ᵇ therein and the member 25 is provided with a wear plate 25ᵃ on each side thereof which is disposed within said slot.

The member 25 is provided at the forward end thereof with a pair of laterally spaced ears 26 which are provided with axially alined apertures 27 for receiving a pin by which the brake assembly is removably connected to the pusher dolly 11.

The rear end of member 25 extends upwardly and rearwardly as indicated at 28. Rigidly secured to the upper and lower edges of the member 25 are the bases 29 and 30 of opposing channel members 31 and 32 respectively.

Pivotally secured to the rear end of base 29 as at 33 is a wheel supporting frame 34 and on the opposite sides of which are rotatably supported runway engaging wheels 35.

A pair of springs 36 have a rigid backing on the member 25 at opposite sides thereof and same react upwardly on housings 37 which have adjustable connections with the frame 34 as indicated at 38. The wheels 35 support the rear end of the brake assembly with the channel member 31 disposed above the track 10 and with the channel member 32 disposed beneath the track 10 and the springs provide for limited vertical movement of the brake assembly relative to the track.

From the above it will be seen that the member 25 is disposed centrally of the channel members 31 and 32 and which with the opposing side flanges of the channel members provides for tandem upper brake shoes 36ᵃ and tandem lower brake shoes 37ᵃ.

The upper brake shoes 36ᵃ are normally retained in a fixed adjusted position which is effected by the following means. A tube 38ᵃ is rotatably journalled in the upper channel member 31 and same is provided with a plurality of brake shoe engaging cam members 39 which as indicated in Figure 8 normally engage the brake shoes 36ᵃ whose downward movement is restricted by a plurality of sag screws 40. The tube 38ᵃ is provided with a plurality of brake release tubular members 41 which extend upwardly through transversely elongated slots in the base 29 of channel member 31. The lower brake shoes 37ᵃ are backed by springs 42 which urge the brake shoes toward the track flanges 13ᵃ.

A track flange 13ᵃ is indicated in Figure 6 and wherein it will be seen that same is tapered toward the front end of the brake assembly and which will merge into a uniformly thickened section whose upper and lower faces will have frictional braking contact with the upper and lower brake shoes.

Reverting now to Figure 1, it will be seen that power cut-off means 45 are disposed on opposite sides of the track 10 at what may be termed a pusher dolly power release station, the said means 45 being in the form of projections which are engageable with power control means extending laterally of the pusher dolly as disclosed in said co-pending application.

In operation, the airplane P first taxis to the end of the runway R for take-off at the starting position of the track 10 as indicated in Figure 1. The hold back leader is then attached to the airplane. The pusher dolly 11 then moves forward to provide the pushing connection as shown in either Figure 2 or Figure 3. The control station operator then runs up the engines of the pusher dolly 11. When the airplane pilot is ready for take-off and the airplane engines are up to the proper R. P. M., the pilot releases the hold back leader and the aircraft is then accelerated down the runway R as is indicated at X in Figure 1. All controls and fuel lines are automatically disconnected, as the airplane reaches the thickened track rail sections, the pusher dolly power is cut-off by the means 45 and the dolly is rapidly decelerated as indicated at Y by the combined release of power and the braking action of the brake assembly on the track rails and the airplane will have reached a take-off acceleration and will take to the air as indicated at Z in Figure 1.

As further indicated in Figure 1, the track 10 may extend to the rear of the hangars H to a pushing position behind airplanes therein, the dolly reaching the main track 10 by way of the branches 10ᵃ. The track loop 10ᵇ may include switch controlled branches 10ᶜ and 10ᵈ for return of the dolly to the hangars or to again traverse the loop 10ᵇ.

The operation as above described is wholly automatic in that the pusher dolly carries alcohol, water, and fuel tanks necessary for the take-off acceleration of the airplane and which at the starting station fuel is provided by a fuel truck which is automatically switched to the dolly fuel tanks at the beginning of the take-off operation. It is of course necessary to release the brake assembly 12 at the position Y after the take-off of the airplane and which is accomplished by insertion of bars into the tubular members 41 and imparting rotation to the tubes 38 for swinging the cam mmebers 39 to positions wherein the said tubular members 41 are vertically disposed. This action releases the springs 42 whereby the braking action is released and the pusher dolly is then ready for return to the start of another accelerating action.

The successive stages of operation are illustrated in Figures 5–A to 5–D inclusive and wherein Figure 5–A shows the pusher dolly 11 about to engage the airplane P. Figure 5–B shows the start of the airplane acceleration after disconnection of the dolly from the truck fuel supply.

Figure 5–C shows the airplane being accelerated by the pusher dolly and Figure 5–D shows the airplane take-off.

Having set forth our invention in accordance with a preferred structural embodiment thereof, what we claim and desire to secure by U. S. Letters Patent is:

1. An airplane accelerating system, comprising in combination with a runway, a guide track in said runway, a high powered, high speed pusher means having a forward pushing engagement with an airplane, a take-off station on said runway, means adjacent said station for cutting-off the power to said pusher means, brake means towed by said pusher means and cooperating with said track, and means adjacent said power cut-off means for effecting operation of said brake means on said track to bring the pusher means to rest subsequent to take-off of the airplane.

2. An airplane accelerating system, comprising in combination with a runway, a guide track in said runway and provided with a thickened section, a light weight high powered pusher dolly having forward pushing engagement with an airplane and guided by said track, pusher dolly power cut-off means adjacent said thickened track section, and a brake assembly towed by said pusher dolly and being operative upon engagement with said thickened track section to bring said pusher dolly to rest.

3. A system for accelerating airplanes on a runway for take-off thereof at a take-off station, comprising an underground guide track, a pusher dolly movable on and guided by said track, a brake assembly towed by said pusher dolly, and guided by said track, means at said station for cutting off the power to said pusher dolly when an airplane being accelerated has assumed a take-off speed, and means on said track cooperating with said brake assembly for bringing said pusher dolly to rest.

4. Means for accelerating an airplane on a runway to a take-off speed; comprising an underground guide track in said runway and extending from the initial point of airplane acceleration to and beyond the point of take-off, a light weight high-powered pusher dolly guided by said track, means projecting forwardly of said dolly for forward releasable pushing engagement with an airplane, a brake assembly towed by said dolly and having guiding engagement with said track, means in advance of said take-off point for cutting off the power for said dolly, and means on said track slightly beyond said last means cooperating with said brake assembly for bringing said dolly to rest.

5. The structure according to claim 4, wherein said track extends from airplane hangars, and a loop in said track adjacent said take-off point for return of the dolly to said hangars.

6. The structure according to claim 4 wherein said first means comprises an elongated pusher bar whose rear end is connected to the front end of said dolly, track engageable means carried by the front end of said bar, and said last means having only a forward pushing engagement with the airplane whereby upon arrest of the movement of said dolly the accelerated airplane is free of engagement therewith for unobstructed take-off.

7. The structure according to claim 4, wherein said track comprises a pair of horizontal flanges with a guiding slot therebetween, said brake assembly comprising brake shoes above said flanges, and brake shoes beneath said flanges, and said flanges including a section of a thickness greater than the normal spacing of said upper and lower brake shoes for effecting a braking action on said dolly.

8. The structure according to claim 6 wherein said track engageable means comprises a shuttle having a forwardly projecting hook for releasable engagement with a bridle releasably supported by the airplane.

9. The structure according to claim 6, wherein said track engageable means comprises a carriage having runway engaging wheels, and means supported by said carriage for removable engagement with the nose wheel of the airplane.

10. The structure according to claim 7 wherein said track flanges include a relatively long tapered section in advance of said thickened section.

11. The structure according to claim 4 wherein said guide track comprises a pair of laterally opposed horizontal flanges having a slot therebetween, said brake assembly comprising an elongated vertically disposed main frame member extending through said slot, an upper normally fixed brake shoe at each side of said member and cooperating with the upper face of said track, a lower brake shoe at each side of said member and being normally spring biased toward the lower face of said track, and said upper brake shoes being retained in normally fixed position by cam means, releasable for increasing the spacing between said upper and lower brake shoes for reducing the biasing action of said spring and releasing the braking action on said track.

12. The structure according to claim 11 wherein the forward end of said main frame member is provided with dolly engageable means, and the rear end of said main frame member being provided with run-way engageable wheels.

13. A pusher dolly having a body with a front and rear portion for track travel, comprising jet propulsion means, and pusher means comprising an elongated bar coupled to the front of the dolly and projecting from and in advance of the front portion thereof, and shuttle means tethered to the free end of said bar, said shuttle means having track engaging means and engaging means for an object to be pushed.

14. The pusher dolly and pusher means described in claim 13, wherein the said shuttle means includes an angularly projecting bifurcated member engaging with a wheel support means of an object to be pushed and brake means operatively associated with said dolly.

15. A pusher dolly for track travel, comprising jet propulsion means and pusher means comprising an elongated bar coupled to the front of the dolly, and shuttle means tethered to the free end of said bar, said shuttle means having track engaging means and engaging means for an object to be pushed, and including a bridle hook.

References Cited in the file of this patent

UNITED STATES PATENTS

| | | |
|---|---|---|
| 2,125,904 | Fellers et al. | Aug. 9, 1938 |
| 2,135,033 | Courtney | Nov. 1, 1938 |
| 2,234,752 | Fleet et al. | Mar. 11, 1941 |
| 2,734,702 | Northrop et al. | Feb. 14, 1956 |

FOREIGN PATENTS

| | | |
|---|---|---|
| 230,311 | Germany | Jan. 23, 1911 |
| 292,826 | Great Britain | June 28, 1928 |